O. W. EDMONDS.
Harrow.
No. 84,807.  Patented Dec. 8, 1868.
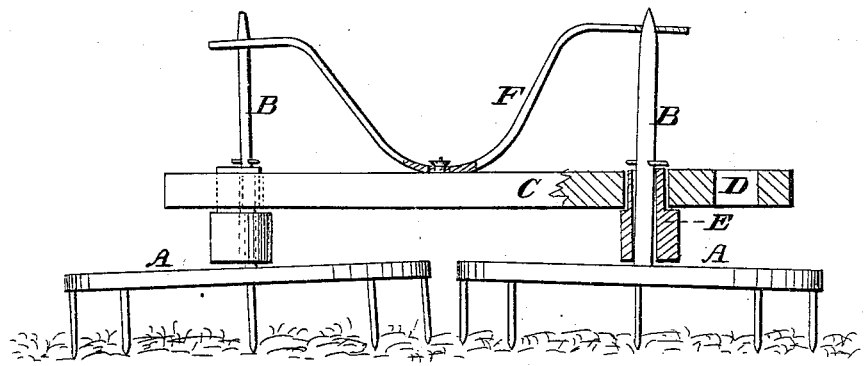

O. W. EDMONDS, OF BLUFFDALE, ILLINOIS.

Letters Patent No. 84,807, dated December 8, 1868.

IMPROVEMENT IN HARROWS.

The Schedule referred to in these Letters Patent and making part of the same.

*To all whom it may concern:*

Be it known that I, O. W. EDMONDS, of Bluffdale, in the county of Greene, and State of Illinois, have invented a new and useful Improvement in Harrows; and I do hereby declare that the following is a full, clear, and exact description thereof, which will enable others skilled in the art to make and use the same, reference being had to the accompanying drawings, forming part of this specification, in which the figure shows a side elevation of my improvement, with a part broken away.

Similar letters of reference indicate corresponding parts.

The nature of this invention relates to improvements in revolving harrows, whereby it is designed to improve the efficacy of the same.

It consists in connecting two rotary harrows to a supporting-beam or frame, by adjustable connections, whereby they may be changed in reference to the distance from each other; and in providing a spring or springs, in connection with the shafts of the harrows and the supporting-frame, whereby the inclination of the harrows with reference to the surface of the ground may be governed, as also the direction of their rotation, as will be more fully described on reference to the accompanying drawings, wherein—

A represents rotating harrows, provided with vertical shafts B.

C represents the connecting-beam, which is provided with square vertical openings D through it.

E represents bushes fitted within the openings D, and provided with holes through their longitudinal centres, which are inclined inward at the lower ends. These holes serve as the bearings for the shafts B, of the harrows, whereby they are maintained in an inclined position with reference to the surface of the ground, the outer sides being the lowest.

A spring, F, is arranged upon the supporting-frame, near the centre, in a secure manner, the outer ends being raised considerably above the said frame, and provided with holes to serve as bearings for the upper ends of the shafts of the harrows, which are inserted therein; the object of which spring is to maintain the said harrows more securely in the said inclined position, and with a yielding pressure.

The beam C and the spring may be provided with several openings for the said shafts, whereby the harrows may be adjusted, in respect to the distances from each other, to suit the circumstances of the case.

By reason of the inclination of the harrows so as to depress the outer portions, they will rotate from each other, when considered in the direction in which they are being drawn, and toward each other when considered in the other direction.

I am aware that it is common to arrange the shafts of the harrows at an inclination towards each other, in order to depress one side of each, and thus produce rotation; therefore I do not wish to claim this feature broadly; but having thus described my invention,

I claim as new, and desire to secure by Letters Patent—

1. The combination, with the beam C and shafts B of the harrow, of the spring F, substantially as and for the purpose described.

2. The combination of the bushes E, beam C, shafts B, and spring F, as herein described, for the purpose specified.

O. W. EDMONDS.

Witnesses:
WILLIAM DAVIDSON,
THOS. J. CARLIN.